(12) United States Patent
Kagayama (10) Patent No.: US 9,348,414 B2
(45) Date of Patent: May 24, 2016

(54) TACTILE PRESENTATION DEVICE

(71) Applicant: MURATA MANUFACTURING CO., LTD., Nagaokakyo-shi, Kyoto-Fu (JP)

(72) Inventor: Kenji Kagayama, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/315,720

(22) Filed: Jun. 26, 2014

(65) Prior Publication Data

US 2014/0306914 A1    Oct. 16, 2014

Related U.S. Application Data

(63) Continuation of application No. PCT/JP2012/083004, filed on Dec. 20, 2012.

(30) Foreign Application Priority Data

Dec. 27, 2011   (JP) ................ 2011-284817

(51) Int. Cl.
G06F 3/01      (2006.01)
G06F 3/0354    (2013.01)
G06F 3/041     (2006.01)

(52) U.S. Cl.
CPC ............ *G06F 3/016* (2013.01); *G06F 3/03547* (2013.01); *G06F 3/041* (2013.01)

(58) Field of Classification Search
CPC ..... G06F 3/0414; G06F 3/016; G06F 3/1643; G06F 3/1675
See application file for complete search history.

(56) References Cited

U.S. PATENT DOCUMENTS

| | | | | |
|---|---|---|---|---|
| 5,854,625 A * | 12/1998 | Frisch et al. | .................. | 345/173 |
| 6,429,846 B2 * | 8/2002 | Rosenberg et al. | ........... | 345/156 |
| 7,852,626 B2 * | 12/2010 | Eldershaw | ............... | 361/679.57 |
| 8,061,182 B2 * | 11/2011 | Weber et al. | ................. | 73/12.06 |
| 8,174,511 B2 * | 5/2012 | Takenaka | ................ | G06F 3/016 345/104 |
| 8,306,500 B2 * | 11/2012 | Tho et al. | ........................ | 455/347 |
| 8,310,457 B2 * | 11/2012 | Faubert et al. | ................ | 345/173 |
| 8,310,458 B2 * | 11/2012 | Faubert et al. | ................ | 345/173 |
| 8,339,250 B2 * | 12/2012 | Je et al. | ....................... | 340/407.2 |
| 8,446,076 B2 * | 5/2013 | Paleczny et al. | .............. | 310/365 |
| 8,618,720 B2 * | 12/2013 | Paleczny et al. | .............. | 310/344 |

(Continued)

FOREIGN PATENT DOCUMENTS

JP     2008-59027 A     3/2008
JP     2008-181365 A    8/2008

(Continued)

OTHER PUBLICATIONS

Written Opinion and International Search Report issued in PCT/JP2012/083004 mailed on Feb. 19, 2013.

*Primary Examiner* — Patrick F Marinelli
(74) *Attorney, Agent, or Firm* — Arent Fox LLP (57) ABSTRACT

A tactile presentation device includes a chassis having a top surface chassis, a bottom surface chassis, and an inner space, a touch panel fixed to the top surface chassis and having an operation surface, an actuator arranged in the inner space, and a vibration transmission member arranged between the actuator and the touch panel. The top surface chassis includes a top surface having a top surface opening exposing the operation surface of the touch panel to outside, and a side surface formed along a peripheral edge of the top surface. The actuator is fixed to the side surface.

19 Claims, 8 Drawing Sheets

(56) References Cited

U.S. PATENT DOCUMENTS

| | | | | |
|---|---|---|---|---|
| 8,629,843 B2* | 1/2014 | Steeves et al. | | 345/173 |
| 8,739,033 B2* | 5/2014 | Rosenberg | | 715/702 |
| 8,816,969 B2* | 8/2014 | Aono et al. | | 345/173 |
| 8,816,981 B2* | 8/2014 | Kai et al. | | 345/173 |
| 8,878,804 B2* | 11/2014 | Ujii et al. | | 345/173 |
| 9,007,320 B2* | 4/2015 | Tsurusaki | | 345/173 |
| 9,030,308 B1* | 5/2015 | Buuck et al. | | 340/407.2 |
| 9,046,947 B2* | 6/2015 | Takeda et al. | | |
| 9,060,438 B2* | 6/2015 | Tsurusaki | | |
| 2001/0035854 A1* | 11/2001 | Rosenberg et al. | | 345/156 |
| 2005/0016824 A1* | 1/2005 | Olcott et al. | | 200/329 |
| 2005/0018172 A1* | 1/2005 | Gelfond et al. | | 356/51 |
| 2005/0115816 A1* | 6/2005 | Gelfond et al. | | 200/339 |
| 2008/0055277 A1* | 3/2008 | Takenaka | | G06F 3/016 345/177 |
| 2008/0062144 A1* | 3/2008 | Shahoian et al. | | 345/173 |
| 2008/0100177 A1* | 5/2008 | Dai | | G06F 3/016 310/317 |
| 2008/0100568 A1* | 5/2008 | Koch et al. | | 345/156 |
| 2008/0143559 A1* | 6/2008 | Dietz et al. | | 341/20 |
| 2008/0202824 A1* | 8/2008 | Philipp et al. | | 178/18.01 |
| 2009/0323264 A1* | 12/2009 | Eldershaw | | 361/679.01 |
| 2010/0090813 A1* | 4/2010 | Je et al. | | 340/407.2 |
| 2010/0156814 A1* | 6/2010 | Weber et al. | | 345/173 |
| 2010/0156818 A1* | 6/2010 | Burrough et al. | | 345/173 |
| 2010/0265197 A1* | 10/2010 | Purdy et al. | | 345/173 |
| 2010/0319434 A1* | 12/2010 | Weber et al. | | 73/12.06 |
| 2010/0328230 A1* | 12/2010 | Faubert et al. | | 345/173 |
| 2010/0328242 A1* | 12/2010 | Paleczny et al. | | 345/173 |
| 2011/0001707 A1* | 1/2011 | Faubert et al. | | 345/173 |
| 2011/0037706 A1* | 2/2011 | Pasquero et al. | | 345/173 |
| 2011/0053653 A1* | 3/2011 | Tho et al. | | 455/566 |
| 2011/0080347 A1* | 4/2011 | Steeves et al. | | 345/173 |
| 2011/0102355 A1* | 5/2011 | Aono et al. | | 345/173 |
| 2011/0102358 A1* | 5/2011 | Aono et al. | | 345/173 |
| 2011/0134059 A1* | 6/2011 | Paleczny et al. | | 345/173 |
| 2011/0210834 A1* | 9/2011 | Pasquero et al. | | 340/407.1 |
| 2011/0227872 A1* | 9/2011 | Huska et al. | | 345/174 |
| 2012/0068939 A1* | 3/2012 | Pemberton-Pigott | | 345/173 |
| 2012/0068971 A1* | 3/2012 | Pemberton-Pigott | | 345/175 |
| 2012/0126959 A1* | 5/2012 | Zarrabi et al. | | 340/407.1 |
| 2012/0154317 A1* | 6/2012 | Aono | | 345/173 |
| 2012/0162143 A1* | 6/2012 | Kai et al. | | 345/177 |
| 2012/0206248 A1* | 8/2012 | Biggs | | 340/407.2 |
| 2013/0009893 A1* | 1/2013 | Okumura et al. | | 345/173 |
| 2013/0016059 A1* | 1/2013 | Lowles et al. | | 345/174 |
| 2013/0038558 A1* | 2/2013 | Ujii et al. | | 345/173 |
| 2013/0044049 A1* | 2/2013 | Biggs et al. | | 345/156 |
| 2013/0093679 A1* | 4/2013 | Dickinson et al. | | 345/168 |
| 2013/0135242 A1* | 5/2013 | Tsurusaki | | 345/173 |
| 2013/0162543 A1* | 6/2013 | Behles | | 345/173 |
| 2013/0215080 A1* | 8/2013 | Takeda et al. | | 345/174 |
| 2013/0222319 A1* | 8/2013 | Tsurusaki | | 345/173 |
| 2013/0286572 A1* | 10/2013 | Tsurusaki | | 361/679.01 |
| 2013/0321321 A1* | 12/2013 | Hiraoka | | 345/173 |
| 2013/0328820 A1* | 12/2013 | Kondoh et al. | | 345/173 |
| 2013/0335210 A1* | 12/2013 | Arai et al. | | 340/407.2 |
| 2013/0335211 A1* | 12/2013 | Kobayashi | | 340/407.2 |
| 2014/0176318 A1* | 6/2014 | Kono | | 340/407.2 |
| 2014/0184545 A1* | 7/2014 | Tanaka | | 345/173 |
| 2014/0305783 A1* | 10/2014 | Kagayama | | 200/521 |
| 2014/0306914 A1* | 10/2014 | Kagayama | | 345/173 |

FOREIGN PATENT DOCUMENTS

| | | |
|---|---|---|
| JP | 2009-77502 A | 4/2009 |
| JP | 2010-152889 A | 7/2010 |
| JP | 2011-107879 A | 6/2011 |

* cited by examiner

TACTILE PRESENTATION DEVICE

CROSS REFERENCE TO RELATED APPLICATIONS

The present application is a continuation of PCT/JP2012/083004 filed Dec. 20, 2012, which claims priority to Japanese Patent Application No. 2011-284817, filed Dec. 27, 2011, the entire contents of each of which are incorporated herein by reference.

FIELD OF THE INVENTION

The present invention relates to a tactile presentation device which provides a tactile sense to an operator according to an operation.

BACKGROUND OF THE INVENTION

Figure 13:
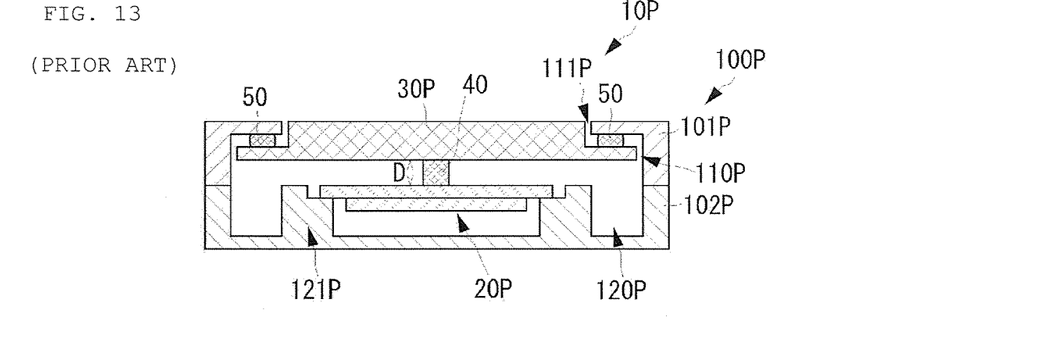
FIG. 13 is a cross-sectional view showing the structure of a conventional tactile presentation device 10P.

Conventionally, various tactile presentation devices have been contrived which provide a tactile sense, such as vibration, to the finger of an operator according to an operation input when the finger of the operator directly touches an operation input panel, such as a touch panel. For instance, Patent Literature 1 describes a portable electronic device as a tactile presentation device. The tactile presentation device has a basic structure as shown in FIG. 13. FIG. 13 is a cross-sectional view showing the structure of a conventional tactile presentation device 10P. FIG. 13 shows the cross section of the tactile presentation device 10P in a plane parallel to the side surface thereof.

The tactile presentation device 10P has a chassis 100P including a top surface chassis 101P and a bottom surface chassis 102P. The top surface chassis 101P includes a top surface on the operation surface side, a side surface orthogonal to the top surface, and has a top surface inner space 110P. The bottom surface chassis 102P has a bottom surface opposite to the top surface of the top surface chassis 101P, a side surface orthogonal to the bottom surface, and a bottom surface inner space 120P. The side surfaces of the top surface chassis 101P and the bottom surface chassis 102P are joined to each other. The top surface inner space 110P and the bottom surface inner space 120P thus communicate with each other. With this structure, the chassis 100P has an inner space having a predetermined area.

Openings 111P are formed in the top surface of the top surface chassis 101P. An operation panel 30P is arranged in the top surface inner space 110P of the top surface chassis 101P. The operation panel 30P has an operation input surface exposed from the openings 111P to the outside. The operation panel 30P is mounted to the top surface chassis 101P via buffer materials 50.

A holding member 121P is formed in the bottom surface inner space 120P of the bottom surface chassis 102P. The holding member 121P projects from the bottom surface. A planar actuator 20P is held by the holding member 121P. The actuator 20P includes a planar base substrate, and a planar piezoelectric element. Driving electrodes are formed on the piezoelectric element. The actuator 20P is held so that the planar surface of the base substrate is parallel to the operation input surface of the operation panel 30P. The actuator 20P is held at the ends of the base substrate so that the base substrate is opposite to the operation panel 30P and that the piezoelectric element is opposite to the bottom surface of the bottom surface chassis 102P.

A pad 40 is arranged between the surface of the actuator 20P on the operation panel 30P side and the surface of the operation panel 30P on the actuator 20P side. Height D of the pad 40 is previously set at the time of designing to coincide with the interval between the operation panel 30P and the actuator 20P.

When the actuator 20P is driven, vibration is caused in the direction orthogonal to the planar surface of the base substrate. The vibration is transmitted via the pad 40 to the operation panel 30P. The vibration transmitted to the operation panel 30P is transmitted to an operator from his/her finger which touches the operation panel 30P. With this, a predetermined tactile sense is presented to the operator.

PTL1: Japanese Patent Application Laid-Open (JP-A) No. 2010-152889.

Figure 14:
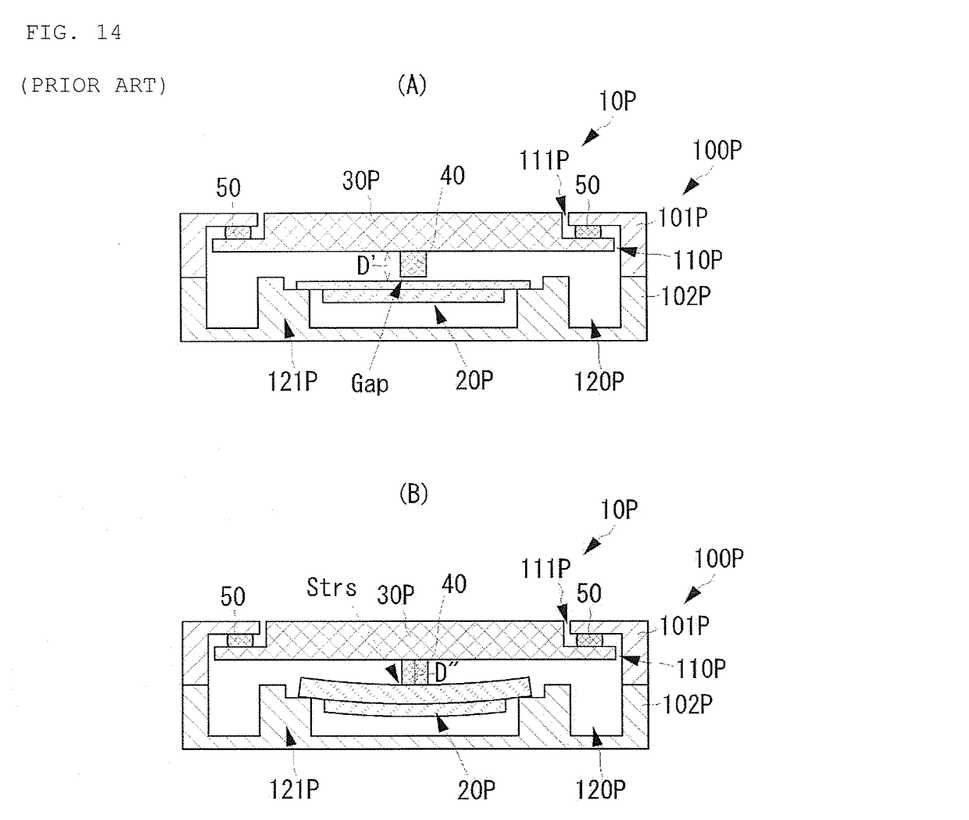
FIGS. 14A and 14B are cross-sectional views of assistance in explaining the problems in the structure of the conventional tactile presentation device 10P.

However, in the conventional tactile presentation device 10P as shown in FIG. 13, the following problems arise. FIGS. 14A and 14B are cross-sectional views of assistance in explaining the problems in the structure of the conventional tactile presentation device 10P. In FIG. 14A, the base substrate of the actuator 20P is thinner than the predetermined thickness. In FIG. 14B, the base substrate of the actuator 20P is thicker than the predetermined thickness. As in FIG. 13, each of FIGS. 14A and 14B shows the cross section of the tactile presentation device 10P in a plane parallel to the side surface thereof.

As shown in FIG. 14A, when the base substrate of the actuator 20P is thinner than the predetermined thickness, interval D' between the actuator 20P and the operation panel 30P is more than height D of the pad 40 (D'>D). Consequently, for instance, when the operation panel 30P and the pad 40 are bonded to each other, as shown in FIG. 14A, a gap Gap is caused between the pad 40 and the actuator 20P. With this, even when the actuator 20P is driven to cause vibration, the pad 40 is not contacted with the base substrate of the actuator 20P. The vibration cannot be transmitted to the operation panel 30P.

As shown in FIG. 14B, when the base substrate of the actuator 20P is thicker than the predetermined thickness, interval D" between the actuator 20P and the operation panel 30P is less than height D of the pad 40 (D"<D). Consequently, as shown in FIG. 14B, load Strs is applied to warp the actuator 20P. The actuator 20P can be broken according to the magnitude of load Strs.

The above problems also arise when the height of each of the side surfaces of the top surface chassis 101P and the bottom surface chassis 102P is different from the desired height, when height D of the pad 40 is different from the desired height, and when the height of the holding member 121P of the bottom surface chassis 102P is different from the desired height. In the conventional structure, when the manufacture dimension accuracy of each of the components constituting the tactile presentation device, in particular, the manufacture dimension accuracy of the chassis 100P and the actuator 20P, is not high, vibration caused in the actuator 20P cannot be reliably transmitted to the operation panel 30P and the actuator 20P can be broken.

SUMMARY OF THE INVENTION

An object of the present invention is to provide a tactile presentation device which can reliably provide a tactile sense to an operator and have a very low breakage possibility.

A tactile presentation device of the present invention includes a chassis having a top surface chassis, a bottom surface chassis, and an inner space, a touch panel fixed to the top surface chassis and having an operation surface, an actuator arranged in the inner space, and a vibration transmission member arranged between the actuator and the touch panel.

The top surface chassis includes a top surface having a top surface opening exposing the operation surface of the touch panel to the outside, and a side surface formed along a peripheral edge of the top surface. The actuator is fixed to the side surface.

Unlike the conventional tactile presentation device, in this structure, the problem that vibration cannot be transmitted to the touch panel without the actuator being contacted with the pad due to manufacture variations in the base substrate of the actuator and the problem that the actuator to which a load is applied is warped and broken do not arise. As a result, a tactile sense can be reliably presented. The tactile presentation device can thus have high reliability.

In the tactile presentation device of the present invention, preferably, the vibration transmission member has one end abutted onto the surface of the touch panel opposite to the actuator, and the other end abutted onto the actuator. In particular, preferably, the actuator has a piezoelectric element, and the vibration transmission member has a height equal to the distance between a plane including the surface of the touch panel opposite to the actuator and a plane including the surface of the actuator on the side on which the piezoelectric element is not arranged.

In the tactile presentation device of the present invention, preferably, the actuator in a planar shape has a planar surface, a portion of the surface thereof opposite to the touch panel being abutted onto the top surface chassis.

In particular, preferably, the touch panel in a planar shape has a planar surface, the planar surface of the actuator and the planar surface of the touch panel are substantially parallel to each other, and the actuator has a vibration mode in which the direction orthogonal to the planar surfaces is a vibration direction.

In the tactile presentation device of the present invention, preferably, the vibration transmission member is abutted onto the center position of the actuator in plan view, and the peripheral edge of the actuator is abutted onto the top surface chassis.

In particular, preferably, the side surface of the top surface chassis has the portion thereof on the peripheral edge side of the top surface and the portion thereof on the center side of the top surface, the portion thereof on the peripheral edge side of the top surface being thicker than the portion thereof on the center side of the top surface, the portion thereof on the center side of the top surface having a first fixing surface parallel to the top surface, and the peripheral edge of the actuator is abutted onto the first fixing surface.

Further, preferably, the vibration transmission member has a height equal to the distance between a plane including the surface of the touch panel opposite to the actuator and a plane including the first fixing surface.

In the tactile presentation device of the present invention, preferably, the vibration transmission member has insulation properties.

In this structure, a driving voltage applied to the actuator can be prevented from being propagated to the touch panel without insulating shield performed separately. With this, size increase due to insulation can be prevented.

Preferably, the tactile presentation device of the present invention further includes a reinforcement member arranged between and spaced from the actuator and the touch panel and having a through-hole inserting the vibration transmission member therethrough.

In this structure, the reinforcement member can limit excessive pressing of the touch panel and warping of the actuator due to an abrupt external shock to the tactile presentation device to reduce breakage of the actuator.

In particular, preferably, the interval between the actuator and the reinforcement member and the interval between the touch panel and the reinforcement member are equal to or less than the maximum allowable warping amount of the actuator.

In this structure, breakage of the actuator due to warping can be prevented.

Further, preferably, the reinforcement member is integral with the top surface chassis.

In this structure, the number of components of the tactile presentation device can be reduced.

According to the present invention, the tactile presentation device can reliably provide a tactile sense to an operator and have a very low breakage possibility.

DETAILED DESCRIPTION OF THE EXEMPLARY EMBODIMENTS

Figure 1:
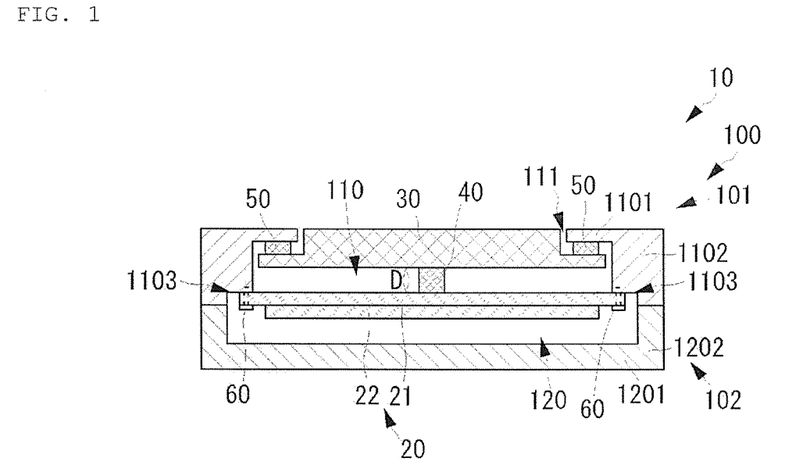
FIG. 1 is a cross-sectional view showing the structure of a tactile presentation device 10 according to a first embodiment of the present invention.
Figure 2:
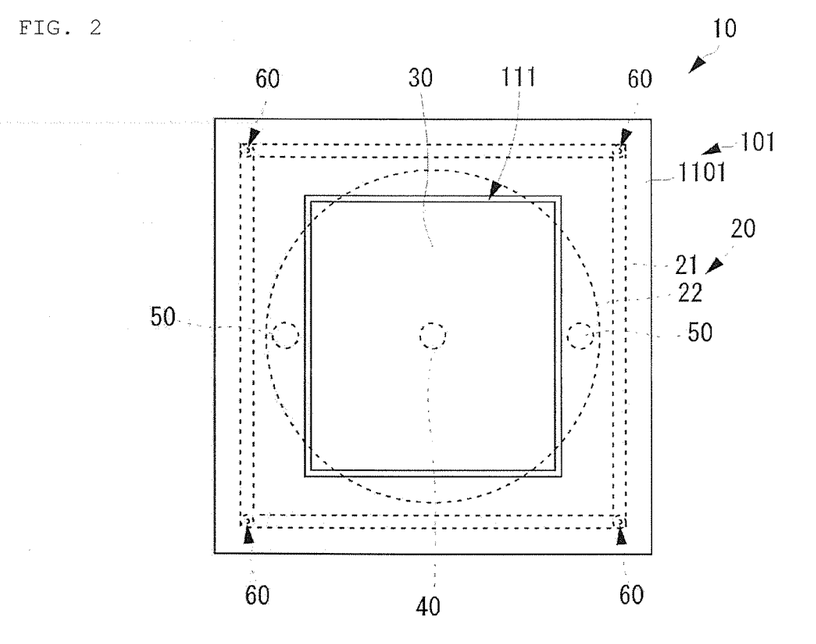
FIG. 2 is a plan view of the tactile presentation device 10 according to the first embodiment of the present invention seen from the top surface side.

A tactile presentation device according to a first embodiment of the present invention will be described with reference to the drawings. FIG. 1 is a cross-sectional view showing the structure of a tactile presentation device 10 according to the first embodiment of the present invention. FIG. 1 shows the cross section of the tactile presentation device 10 in a plane parallel to the side surface thereof. FIG. 2 is a plan view of the tactile presentation device 10 according to the first embodiment of the present invention seen from the top surface side.

The tactile presentation device 10 includes an actuator 20, a touch panel 30, and a chassis 100. The chassis 100 has a substantially rectangular parallelepiped shape. The chassis 100 has a substantially square shape seen from the top surface side, and a predetermined thickness. The chassis 100 includes a top surface chassis 101, and a bottom surface chassis 102. The top surface chassis 101 and the bottom surface chassis 102 are formed of a metal or resin, having predetermined rigidity.

The top surface chassis 101 includes a top surface 1101, and a side surface 1102. The top surface 1101 has a substantially square planar shape seen from the top surface side, and is formed with a top surface opening 111 at the center thereof. That is, the top surface 1101 has a planar surface. The top surface opening 111 is a through-hole passing through the top surface 1101 in the thickness direction. The top surface opening 111 exposes the operation surface of the touch panel 30 to the outside. Therefore, the top surface 1101 is located on the operation surface side of the tactile presentation device 10. The side surface 1102 is formed along the peripheral edge of the top surface 1101 to be orthogonal to the planar surface of the top surface 1101. With this, the top surface chassis 101 is opened opposite to the bottom surface chassis 102. The thickness of the side surface 1102 (the dimension in the direction orthogonal to the planar surface of the top surface 1101) is appropriately determined according to each component arranged in the chassis 100, and the like. The side surface 1102 has a thickness different portion. Specifically, the portion of the side surface 1102 on the peripheral edge side of the top surface 1101 is thicker than the portion of the side surface 1102 on the center side of the top surface 1101. The portion of the side surface 1102 on the center side of the top surface 1101 has a first fixing surface 1103. The first fixing surface 1103 has a plane parallel to the planar surface of the top surface 1101. With such a structure, the top surface chassis 101 has a top surface inner space 110 formed by the top surface 1101 and the side surface 1102.

The bottom surface chassis 102 includes a bottom surface 1201, and a side surface 1202. The bottom surface 1201 has a substantially square planar shape seen from the top surface side, and is opposite to the top surface 1101 of the top surface chassis 101. That is, the bottom surface 1201 has a planar surface. The side surface 1202 is formed along the peripheral edge of the bottom surface 1201 to be orthogonal to the planar surface of the bottom surface 1201. With this, the bottom surface chassis 102 is opened opposite to the top surface chassis 101. The thickness of the side surface 1202 (the dimension in the direction orthogonal to the planar surface of the bottom surface 1201) is appropriately determined according to each component arranged in the chassis 100, and the like. With such a structure, the bottom surface chassis 102 has a bottom surface inner space 120 formed by the bottom surface 1201 and the side surface 1202.

The top surface chassis 101 and the bottom surface chassis 102 having such a structure have the side surfaces 1102 and 1202 joined to each other. With this, the chassis 100 has an inner space formed so that the top surface inner space 110 and the bottom surface inner space 120 communicate with each other. Here, when the thickness of the side surfaces 1102 and 1202 is minimum, the chassis 100 can be low in height.

The touch panel 30 is arranged in the inner space of the chassis 100, more specifically, in the top surface inner space 110 of the top surface chassis 101. The touch panel 30 is planar, and has one principal plane which is the operation surface. That is, the touch panel 30 has a planar surface. The touch panel 30 is mounted over the top surface chassis 101 so that the operation surface is exposed from the top surface opening 111 of the top surface chassis 101 to the outside. Specifically, the peripheral edge of the touch panel 30 is not exposed from the top surface opening 111, and is mounted over the top surface 1101 via buffer materials 50 provided to the peripheral edge thereof. The buffer materials 50 are made of a material having low elasticity, and are e.g., an adhesive. With the use of the buffer materials 50 made of a material having low elasticity, vibration transmitted from the actuator 20 to the touch panel 30 can be prevented from being leaked to the chassis 101.

The actuator 20 is a piezoelectric actuator, and include a planar base substrate 21 and a planar piezoelectric element 22. That is, the actuator 20 and the base substrate 21 have planar surfaces. The base substrate 21 is formed of a 42 Ni metal or stainless steel, or a glass epoxy resin. The base substrate 21 should have higher elasticity. With higher elasticity, vibration loss can be reduced. In addition, when the base substrate 21 is formed of an insulation resin, a driving signal (voltage) applied to the piezoelectric element 22 can be prevented from being leaked to the chassis 100 and the touch panel 30.

The piezoelectric element 22 has a planar piezoelectric body made of piezoelectric ceramics and a driving electrode applying a driving signal to the piezoelectric body. That is, the piezoelectric body has a planar surface. The piezoelectric body should be formed of a material containing lead zirconate titanate ceramics, and may be formed of a material containing a non-lead piezoelectric body ceramics such as alkali niobate ceramics such as potassium-sodium niobate. The driving electrode is formed on the opposite planar surfaces of the piezoelectric bodies. The piezoelectric element 22 is driven in d31 mode, and is deformed to be extended and shrunk along the planar surface of the piezoelectric body. The piezoelectric element 22 is arranged on one principal plane of the base substrate 21.

By deformation of the piezoelectric element 22, the actuator 20 is bent to cause vibration in the direction orthogonal to the planar surfaces of the base substrate 21.

The actuator 20 is arranged so that the peripheral edge of the base substrate 21 is abutted onto the first fixing surface 1103 of the top surface chassis 101. The base substrate 21 is rigidly fixed to the first fixing surface 1103 with fixing members 60, such as screws. In this case, the base substrate 21 is fixed so that the surface thereof on the side on which the piezoelectric element 22 is not arranged is abutted onto the first fixing surface 1103. In FIG. 1, screws are used as the fixing members 60, but adhesives or adhesive tapes may be used as the fixing members 60. In this way, the actuator 20 is held so that the planar surface of the base substrate 21 is substantially parallel to the operation surface of the touch panel 30.

A pad 40 is arranged between the actuator 20 and the touch panel 30. The pad 40 is e.g., tubular, and is made of a material having high elasticity. The height of the pad 40 is equal to distance D between a plane including the surface of the touch panel 30 opposite to the actuator 20 and a plane including the first fixing surface 1103 of the top surface chassis 101. With this, the height of the pad 40 is equal to distance D between a plane including the surface of the touch panel 30 opposite to the actuator 20 and a plane including the surface of the actuator 20 on the side on which the piezoelectric element 22 is not arranged. Therefore, the pad 40 has one end in the height direction abutted onto the surface of the touch panel 30 opposite to the actuator 20, and the other end in the height direction abutted onto the base substrate 21. In this case, when the touch panel 30 is not pressed by an operator and the actuator 20 is not driven, a force is not applied to between the touch panel 30, the pad 40, and the actuator 20.

The tactile presentation device 10 which has such a structure detects that the touch panel is directly touched and operated by the finger of the operator, and drives the actuator 20. Vibration from the actuator 20 is transmitted to the touch panel 30 via the pad 40 to vibrate the touch panel 30. That is, the pad 40 is a vibration transmission member which transmits vibration from the actuator 20 to the touch panel 30. The vibration transmitted to the touch panel 30 is transmitted to the operator from his/her finger which touches the touch panel 30. With this, a predetermined tactile sense is presented to the operator who operates the touch panel 30.

In the tactile presentation device 10, the planar surface of the actuator 20 and the planar surface of the touch panel 30 are substantially parallel to each other, and the direction orthogonal to the planar surfaces is the vibration direction. Therefore, vibration from the actuator 20 can be effectively provided to the touch panel 30. In addition, the planar surface of the actuator 20 and the planar surface of the touch panel 30 are substantially parallel to each other, so that the chassis 100 can be thinner. The thin tactile presentation device 10 can effectively present a tactile sense.

The pad 40 should be arranged in the center position of the actuator 20 in plan view. With this, the pad 40 is arranged at the position where the amplitude of vibration in the actuator 20 is maximum, so that the vibration can be transmitted to the touch panel 30 more effectively. Further, the centers of the touch panel 30 in plan view and the center of the actuator 20 in plan view substantially coincide with each other in the chassis 100 in top view. With this, the vibration can be transmitted to the touch panel 30 more effectively. Therefore, a tactile sense can be presented more effectively.

Figure 3:
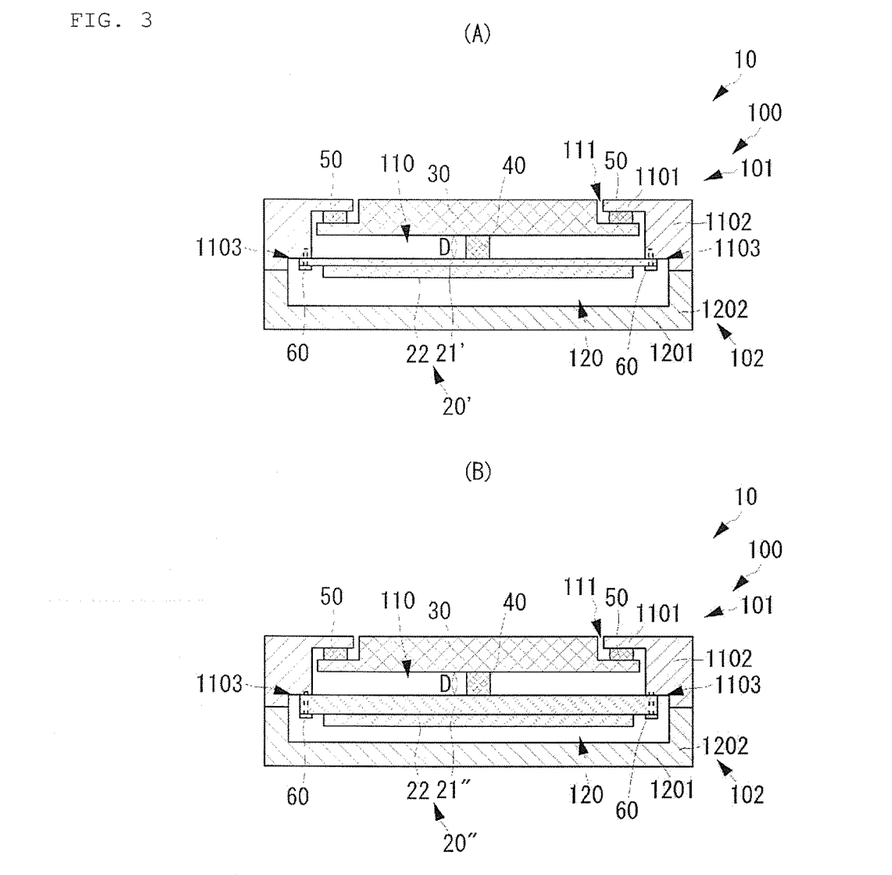
FIGS. 3A and 3B are diagrams of assistance in explaining the tactile presentation device 10 according to the first embodiment of the present invention which is not influenced by manufacture variations in actuators.

In the structure body having a plurality components like the tactile presentation device, manufacture variations in the components may influence its characteristic and reliability. As described in the above problems, in the tactile presentation device, the position relation between the actuator and the touch panel is important. Next, the influence of manufacture variations in the actuator 20 of the tactile presentation device 10 according to the present embodiment will be described. FIGS. 3A and 3B are diagrams of assistance in explaining the tactile presentation device 10 according to the present embodiment which is not influenced by manufacture variations in actuators. In FIG. 3A, a base substrate 21' of an actuator 20' is thinner than a desired thickness. In FIG. 3B, a base substrate 21'' of an actuator 20'' is thicker than a desired thickness. Like FIG. 1, FIGS. 3A and 3B show the cross sections of the tactile presentation device 10 in a plane parallel to the side surface thereof.

As described above, in the tactile presentation device 10, the actuator is mounted on the top surface chassis 101 over which the touch panel 30 is mounted. The actuator is mounted thereon so that the peripheral edge of the base substrate is abutted onto the first fixing surface 1103 of the top surface chassis 101. Therefore, even when the base substrate 21' of the actuator 20' is thinner than the desired thickness as shown in FIG. 3A and even when the base substrate 21'' of the actuator 20'' is thicker than the desired thickness as shown in FIG. 3B, distance D between a plane including the surface of the touch panel 30 opposite to the actuator and a plane including the surface of the actuator on the side on which the piezoelectric element 22 is not arranged is not changed.

Therefore, the distance D constantly coincides with the height of the pad 40. With this, unlike the conventional tactile presentation device, the problem that vibration cannot be transmitted to the touch panel without the actuator being contacted with the pad due to manufacture variations in the base substrate of the actuator and the problem that the actuator to which a load is applied is warped and broken do not arise. As a result, a tactile sense can be reliably presented. The tactile presentation device 10 can thus have high reliability.

Figure 4:
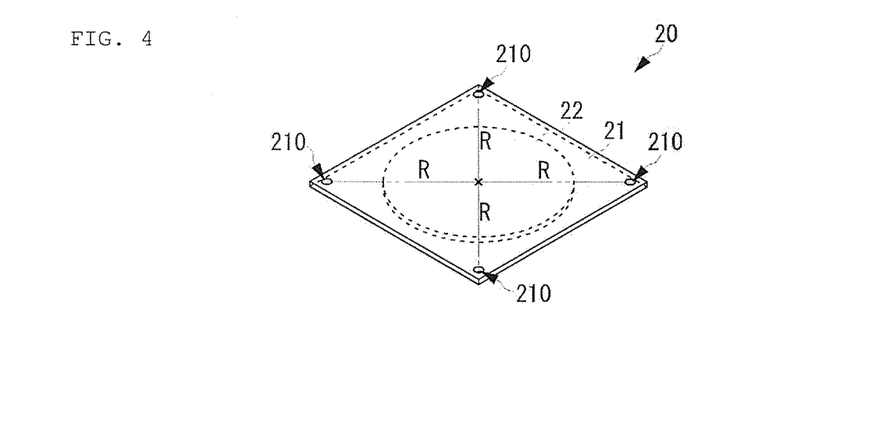
FIG. 4 is an appearance perspective view of an actuator 20 constituting the tactile presentation device 10 according to the first embodiment of the present invention.

The actuator 20 should be mounted on the top surface chassis 101 by using the following structure. FIG. 4 is an appearance perspective view of the actuator 20 constituting the tactile presentation device 10 according to the first embodiment of the present invention.

The base substrate 21 of the actuator 20 is substantially square in plan view. The piezoelectric element 22 is circular in plan view. The center of the piezoelectric element 22 in plan view and the center of the base substrate 21 in plan view coincide with each other. In other words, the center of the piezoelectric element 22 in plan view and the center of the base substrate 21 in plan view coincide with the center of the actuator 20 in plan view.

Fixing through-holes 210 are formed in the base substrate 21. The fixing through-holes 210 are formed near four corners of the base substrate 21 in plan view. Distances R from the center of the base substrate 21 in plan view to the fixing through-holes 210 are the same. The actuator 20 is fixed to the top surface chassis 101 with the fixing members (screws) 60 inserted through the fixing through-holes 210.

Figure 5:
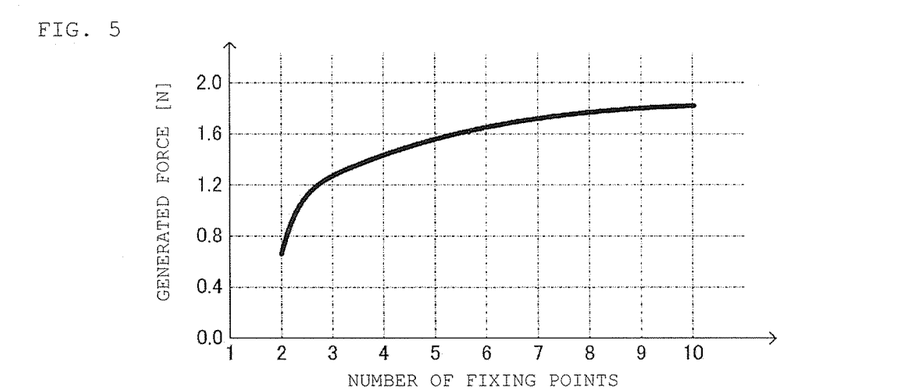
FIG. 5 is a graph showing the relation between the number of fixing points and the generated force in a touch panel 30 in the tactile presentation device 10 according to the first embodiment of the present invention.

In FIG. 4, the four fixing through-holes 210 are formed, but the present invention is not limited to this. FIG. 5 is a graph showing the relation between the number of fixing points and the generated force in the touch panel 30 in the tactile presentation device 10 according to the first embodiment of the present invention. Here, the fixing points are points at which the actuator 20 is fixed to the top surface chassis 101, specifically, the fixing through-holes 210. In FIG. 5, when the generated force in the touch panel 30 is large, vibration from the actuator 20 is transmitted to the touch panel 30 at small loss. As shown in FIG. 5, as the number of fixing points is larger, the generated force in the touch panel 30 is increased. However, as the number of fixing points is larger, the area required for fixing the base substrate 21 is increased, which is disadvantageous for size reduction. Therefore, as seen from FIG. 5, since the increase amount of the generated force in the touch panel 30 with respect to the increase of the number of fixing points is gradually decreased, the number fixing points should be set to a minimum value, if necessary, to the extent that a necessary generated force can be obtained. This can cope with ensuring of the necessary generated force and size reduction.

In FIG. 5, the fixing points are arranged in turning symmetry with respect to the center of the actuator 20 in plan view. Each of the fixing points is arranged in turning symmetry, so that the above effect can be reliably obtained.

As shown in FIG. 4, distances R from the center of the base substrate 21 in plan view to the fixing points (fixing through-holes 210) are desirably the same. This is because the generated force in the touch panel 30 is influenced by the fixing point located in the nearest position from the center of the base substrate 21 in plan view, so that the generated force is influenced by the number of fixing points in the distances.

The fixing members 60 are screws in the result of FIG. 5, but the same operation and effect can be obtained even by another fixing method. For instance, in the case where the fixing members 60 are adhesive tapes, the number of the adhesive tapes in which the distances from the center of the base substrate 21 in plan view are constant corresponds to the number of fixing points. In the case where the fixing members 60 are adhesives, the number of the application locations of the adhesives in which the distances from the center of the base substrate 21 in plan view are constant corresponds to the number of fixing points.

With the same magnitude (voltage) of a driving signal, as the distance from the center of the base substrate 21 in plan view is longer, the amplitude of vibration from the actuator 20 is increased. On the other hand, as the distance from the base substrate 21 in plan view is longer, the generated force is decreased. In consideration of these conditions, distances R from the center of the base substrate 21 in plan view to the fixing points (fixing through-holes 210) should be set so that the button type touch panel 30 can provide vibration necessary for the tactile presentation device 10.

Figure 6:
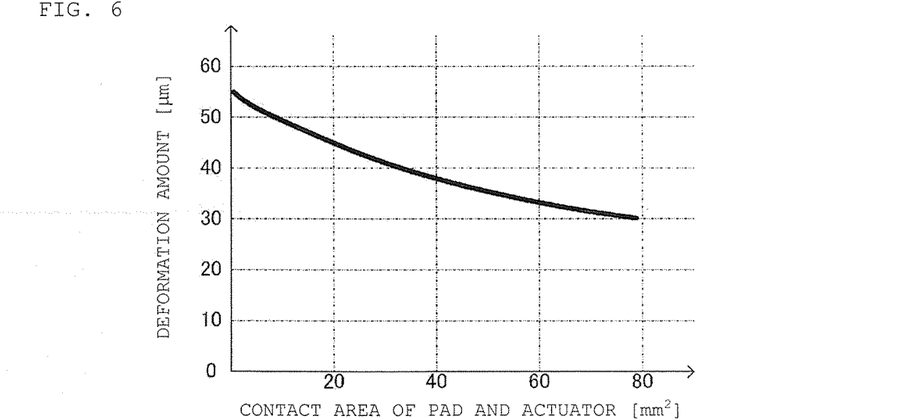
FIG. 6 is a graph showing the relation between the contact area of a pad 40 and the actuator 20 and the deformation amount provided to the touch panel 30 in the tactile presentation device 10 according to the first embodiment of the present invention.

The contact area of the pad 40 and the actuator 20 should be set properly. FIG. 6 is a graph showing the relation between the contact area of the pad 40 and the actuator 20 and the deformation amount provided to the button type touch panel 30. As shown in FIG. 6, as the contact area of the pad 40 and the actuator 20 is smaller, the deformation amount provided to the button type touch panel 30 is increased. In this point, the contact area of the pad 40 and the actuator 20 should be minimum. However, when the contact area of the pad 40 and the actuator 20 is too small, the pad 40 becomes very small. Consequently, handling becomes difficult, so that the operation efficiency at the time of manufacture can be lowered. Therefore, actually, the shape of the pad 40 should be determined so that the contact area of the pad 40 and the actuator 20 is approximately 1 mm$^2$.

Fixing of the actuator 20 and installation of the pad 40 are set more strictly, so that the tactile presentation device can provide the above operation and effect, such as reliability and present a tactile sense more efficiently.

Figure 7:
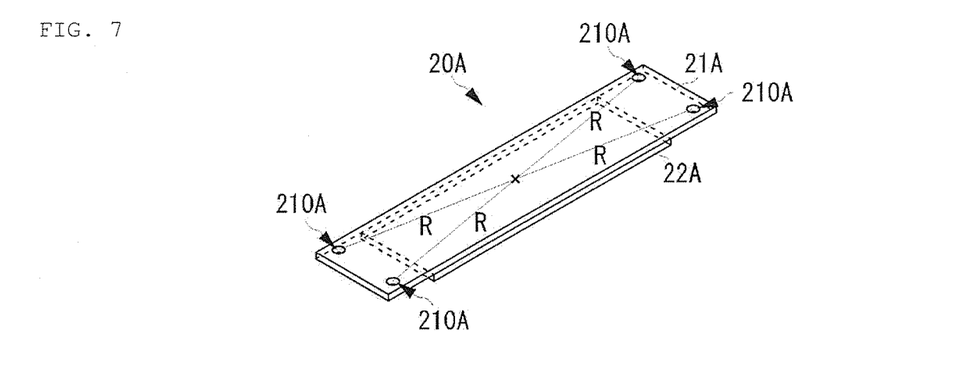
FIG. 7 is an appearance perspective view of a modification example of the tactile presentation device 10 according to the first embodiment of the present invention and an actuator 20A having a structure different from the actuator 20.

FIG. 4 exemplarily shows the actuator 20 in which the circular piezoelectric element 22 in plan view is arranged on the substantially square base substrate 21 in plan view, but an actuator 20A having the shape shown in FIG. 7 may be employed. FIG. 7 is an appearance perspective view of a modification example of the tactile presentation device 10 according to the first embodiment of the present invention and the actuator 20A having a structure different from the actuator 20. The actuator 20A includes a base substrate 21A and a piezoelectric element 22A. The base substrate 21A is rectangular in plan view. The piezoelectric element 22A is rectangular in plan view. The piezoelectric element 22A is arranged on one principal plane of the base substrate 21A. The length of the piezoelectric element 22A is shorter than the length of the base substrate 21A. The width of the piezoelectric element 22A is substantially the same as the width of the base substrate 21A. The center of the piezoelectric element 22A in plan view and the center of the base substrate 21A in plan view substantially coincide with each other. Fixing through-holes 210A are formed in the base substrate 21A. The fixing through-holes 210A are formed near four corners of the base substrate 21A in plan view. Distances R from the center of the base substrate 21A in plan view to the fixing through-holes 210A are the same. Even with such a structure, the same operation and effect as the actuator 20 can be obtained.

Figure 8:
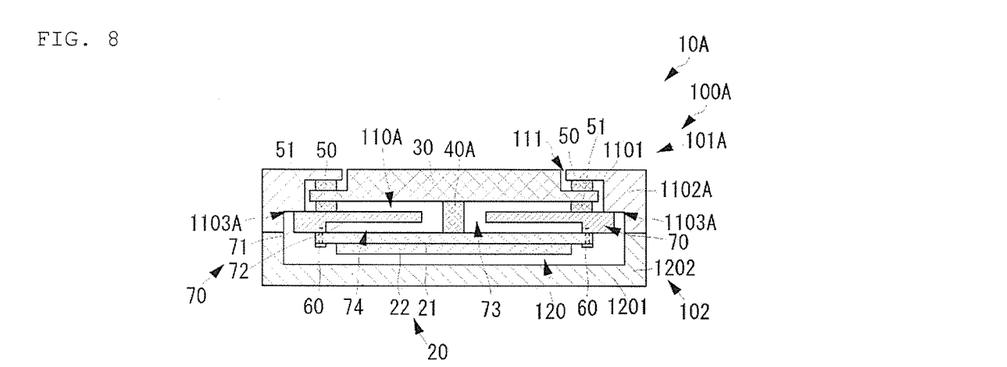
FIG. 8 is a cross-sectional view showing the structure of a tactile presentation device 10A according to a second embodiment of the present invention.

A tactile presentation device according to a second embodiment of the present invention will be described with reference to the drawing. FIG. 8 is a cross-sectional view showing the structure of a tactile presentation device 10A according to the second embodiment of the present invention. FIG. 8 shows the cross section of the tactile presentation device 10A in a plane parallel to the side surface thereof. The tactile presentation device 10A according to the present embodiment has the same structure as the tactile presentation device 10 shown in the first embodiment except that a reinforcement member 70 is added, and only the relevant portions will be described in detail.

Like the tactile presentation device 10 according to the first embodiment, the tactile presentation device 10A has the actuator 20, and the touch panel 30. In place of the chassis 100 of the tactile presentation device 10 according to the first embodiment, the tactile presentation device 10A has a chassis 100A. The chassis 100A includes a top surface chassis 101A and the bottom surface chassis 102. The top surface chassis 101A includes the top surface 1101 and a side surface 1102A. The top surface 1101 is the same as the first embodiment, and has the top surface opening 111. Like the side surface 1102 shown in the first embodiment, the side surface 1102A is formed along the peripheral edge of the top surface 1101 to be orthogonal to the planar surface of the top surface 1101 like the side surface 1102, and has a thickness different portion. Specifically, the portion of the side surface 1102A on the peripheral edge side of the top surface 1101 is thicker than the portion of the side surface 1102A on the center side of the top surface 1101. The portion of the side surface 1102A on the center side of the top surface 1101 has a first fixing surface 1103A. The first fixing surface 1103A is parallel to the planar surface of the top surface 1101. With such a structure, the top surface chassis 101A has a top surface inner space 110A formed by the top surface 1101 and the side surface 1102A. The bottom surface chassis 102 is the same as the first embodiment.

The top surface chassis 101A and the bottom surface chassis 102 having such a structure have the side surfaces 1102A and 1202 joined to each other. With this, the chassis 100A has an inner space formed so that the top surface inner space 110A and the bottom surface inner space 120 communicate with each other.

The touch panel 30 and the reinforcement member 70 are mounted in the inner space of the chassis 100A, more specifically, in the top surface inner space 110A of the top surface chassis 101A. The mounting structure of the touch panel 30 over the top surface chassis 101A via the buffer materials 50 is the same as the first embodiment.

The reinforcement member 70 is planar, and includes an outer peripheral portion 71 and an inner peripheral portion 72. The outer peripheral portion 71 and the inner peripheral portion 72 have different thicknesses so that the outer peripheral portion 71 is thicker than the inner peripheral portion 72. By this thickness difference, a recess 74 having a predetermined depth (height) is formed on one surface of the reinforcement member 70. A through-hole 73 is formed at the center of the reinforcement member 70 in plan view. In other words, the through-hole 73 is formed at the center of the inner peripheral portion 72. The through-hole 73 has an opening diameter to the extent of inserting at least the pad 40 therethrough. Like the chassis 100A, the reinforcement member 70 is made of a material having high rigidity. Further, the reinforcement member 70 is desirably made of an insulation material. Since the reinforcement member 70 is made of an insulation material, a driving signal applied to the actuator 20 can be prevented from being leaked to the chassis 100A. With this, even when the chassis 100A is formed of a material such as a metal, having conductivity, a driving signal can be prevented from being leaked to the operator.

The reinforcement member 70 is fixed to the top surface chassis 101A so that the surface thereof on the side on which the recess 74 is not formed is abutted onto the first fixing surface 1103A. Buffer materials 51 are arranged between the reinforcement member 70 and the touch panel 30. The buffer materials 51 have substantially the same shape as the buffer materials 50, and are located opposite to the buffer materials 50 across the touch panel 30.

The actuator 20 has the same structure as the first embodiment, and is fixed to the reinforcement member 70 with the fixing members 60. In this case, the actuator 20 is arranged on the reinforcement member 70 on the side on which the recess 74 is formed. The actuator 20 is fixed to the reinforcement member 70 so that the base substrate 21 is abutted onto the outer peripheral portion 71.

With such a structure, a void having the recess 74 is formed between the actuator 20 and the inner peripheral portion 72 of the reinforcement member 70. In other words, the actuator 20 and the inner peripheral portion 72 of the reinforcement member 70 are spaced at a predetermined interval.

A pad 40A is arranged between the center of the actuator 20 and the center of the touch panel 30 so as to be inserted through the through-hole 73 of the reinforcement member 70. The height of the pad 40A is equal to the distance between a plane including the surface of the touch panel 30 opposite to the actuator 20 and a plane including the surface of the outer peripheral portion 71 of the reinforcement member 70 on the side on which the actuator 20 is fixed. With this, the height of the pad 40A is equal to the distance between a plane including the surface of the touch panel 30 opposite to the actuator 20 and a plane including the surface of the actuator 20 on the side on which the piezoelectric element 22 is not arranged. Therefore, like the first embodiment, the pad 40A has one end in the height direction abutted onto the surface of the touch panel 30 opposite to the actuator 20, and the other end in the height direction abutted onto the base substrate 21. In this case, when the touch panel 30 is not pressed by the operator and the actuator 20 is not driven, a force is not applied to between the touch panel 30, the pad 40A, and the actuator 20.

Like the first embodiment, even with such a structure, vibration generated in the actuator 20 can be provided to the touch panel 30, so that a tactile sense of the vibration can be provided to the operator. In addition, the problem that vibration cannot be transmitted to the touch panel without the actuator being contacted with the pad due to manufacture variations in the base substrate of the actuator and the problem that the actuator to which a load is applied is warped and broken do not arise. As a result, a tactile sense can be reliably presented. The tactile presentation device 10A can thus have high reliability.

In the structure of the present embodiment, the following effect can be obtained. The interval between the touch panel 30 and the reinforcement member 70 is equal to or less than the maximum allowable warping amount of the actuator 20. In addition, the interval between the inner peripheral portion 72 of the reinforcement member 70 and the actuator 20 (the depth of the recess 74) is also equal to or less than the maximum allowable warping amount of the actuator 20. The maximum allowable warping amount means the critical bending amount (the length in the direction orthogonal to the planar surface) in which the piezoelectric body constituting the piezoelectric element 22 is broken when the piezoelectric element 22 constituting the actuator 20 is bent in the direction orthogonal to the planar surface. That is, when bending greater than the maximum allowable warping amount is caused, the piezoelectric body is broken.

Figure 9:
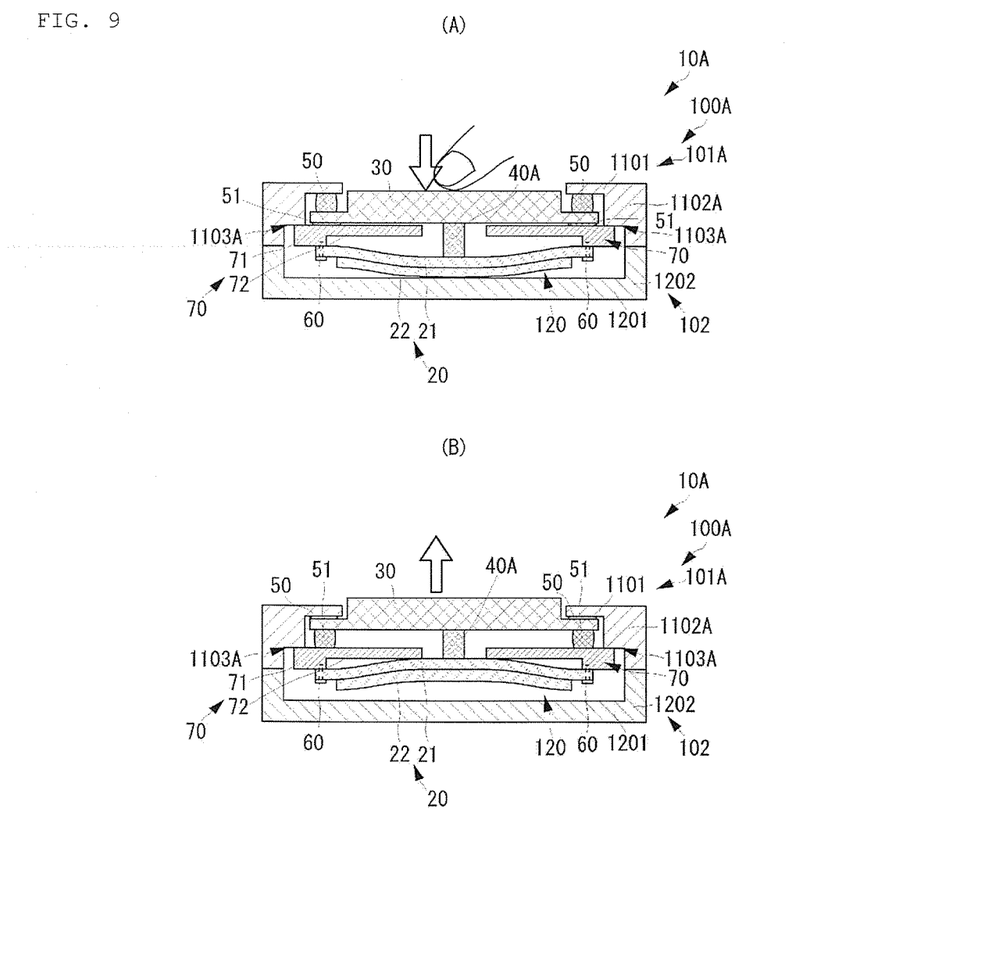
FIGS. 9A and 9B are cross-sectional views showing states where an external force is applied to the tactile presentation device 10A according to the second embodiment of the present invention to bend the actuator 20.

FIGS. 9A and 9B are cross-sectional views showing states where an external force is applied to the tactile presentation device 10A according to the present embodiment to bend the actuator 20. In FIG. 9A, the finger of the operator strongly presses the touch panel 30. In FIG. 9B, a shock is applied from the outside to the tactile presentation device 10A to bend the actuator 20 to the touch panel 30 side.

As shown in FIG. 9A, the touch panel 30 which is strongly pressed is sunk into the chassis 100A. The pad 40 is sunk according to sinking of the chassis 100A, so that the pressing force acts to the center of the actuator 20. The actuator 20 whose peripheral edge is fixed is bent by the pressing force.

However, when the interval between the touch panel 30 and the reinforcement member 70 is equal to or less than the maximum allowable warping amount of the actuator 20, the sinking amount of the touch panel 30 is made constant by the reinforcement member 70. Bending of the actuator 20 by the pressing force caused by sinking of the touch panel 30 is thus equal to or less than the maximum allowable warping amount of the actuator 20. Therefore, even when such a pressing force is applied, breakage of the piezoelectric body of the actuator 20 can be prevented. In this case, when the distance between the piezoelectric element 22 and the inner surface of the bottom surface chassis 102 is more than the maximum allowable warping amount of the actuator 20, the piezoelectric element 22 cannot be contacted with the bottom surface chassis 102 at the time of bending of the actuator 20 by the pressing force caused by sinking of the touch panel 30. Therefore, breakage of the piezoelectric body due to bending of the actuator 20 can be prevented more reliably.

As shown in FIG. 9B, when a shock is applied from the outside, the actuator 20 may be bent to the touch panel 30 side. However, when the interval between the actuator 20 and the inner peripheral portion 72 of the reinforcement member 70 is equal to or less than the maximum allowable warping amount of the actuator 20, the warping amount of the actuator 20 is made constant by the inner peripheral portion 72 of the reinforcement member 70. Bending of the actuator 20 by the external force is thus equal to or less than the maximum allowable warping amount of the actuator 20. Therefore, even when such an external force is applied, breakage of the piezoelectric body of the actuator 20 can be prevented. In this case, even when the actuator 20 is bent, the piezoelectric element 22 cannot be contacted with the reinforcement member 70. Therefore, breakage of the piezoelectric body due to bending of the actuator 20 can be prevented more reliably.

Figure 10:
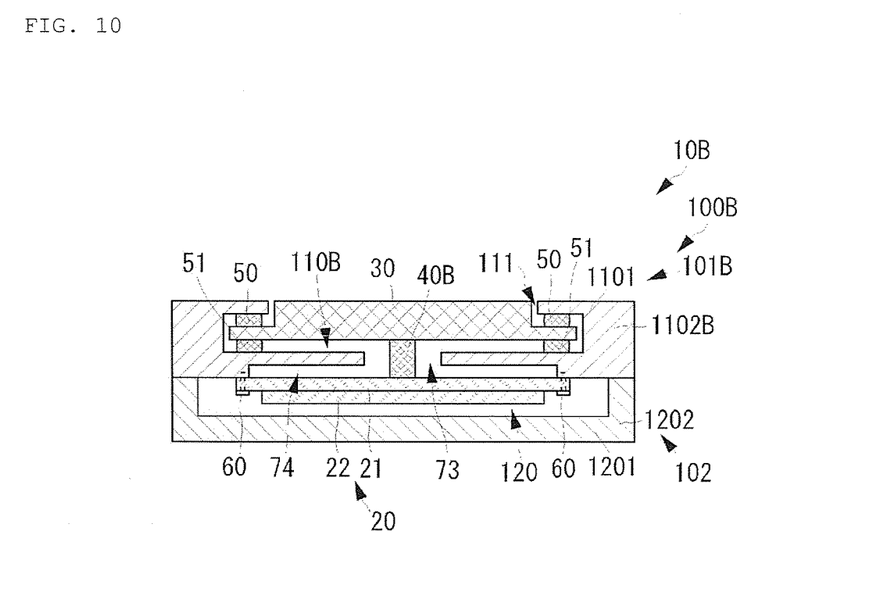
FIG. 10 is a cross-sectional view showing the structure of a tactile presentation device 10B according to a third embodiment of the present invention.

A tactile presentation device according to a third embodiment of the present invention will be described with reference to the drawing. FIG. 10 is a cross-sectional view showing the structure of a tactile presentation device 10B according to the third embodiment of the present invention. FIG. 10 shows the cross section of the tactile presentation device 10B in a plane parallel to the side surface thereof.

The tactile presentation device 10B shown in FIG. 10 has almost the same structure as the tactile presentation device 10A according to the second embodiment except that a top surface chassis 101B which integrates the top surface chassis 101A of the tactile presentation device 10A with the reinforcement member 70 is provided.

In place of the chassis 100A of the tactile presentation device 10A according to the second embodiment, the tactile presentation device 10B has a chassis 100B including the top surface chassis 101B and the bottom surface chassis 102. The top surface chassis 101B integrates the top surface chassis 101A of the tactile presentation device 10A according to the second embodiment with the reinforcement member 70, and has the top surface 1101 and a side surface 1102B. Therefore, like the second embodiment, the top surface chassis 101B has a top surface inner space 110B formed by the top surface 1101 and the side surface 1102B. With such a structure, the mounting accuracy of the top surface chassis and the reinforcement member is not influenced. Therefore, the interval between the touch panel 30 and the actuator 20 can be more accurate.

Figure 11:
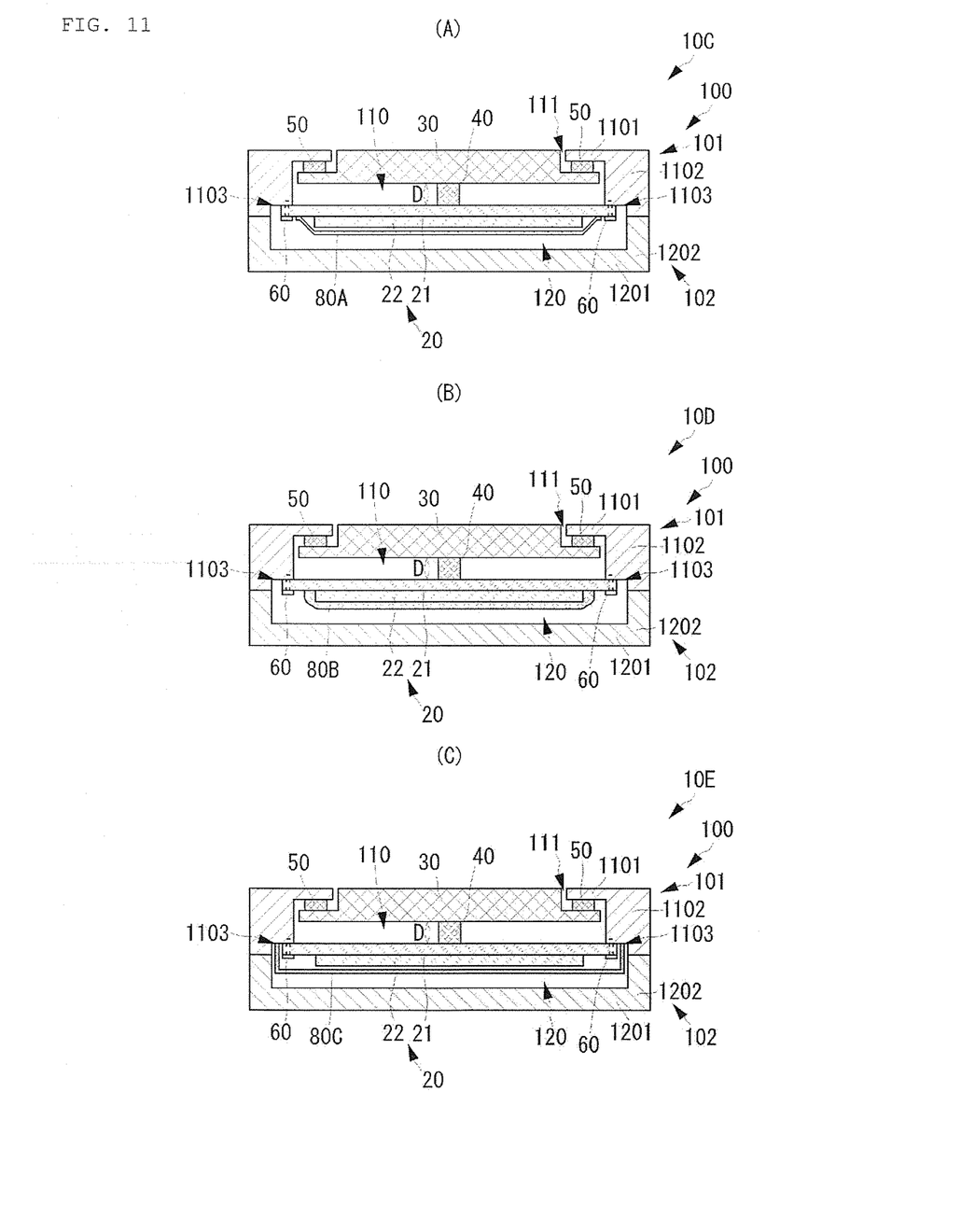
FIGS. 11A, 11B, and 11C are cross-sectional views showing the structures of tactile presentation devices 10C, 10D, and 10E of modification examples of the tactile presentation device 10 according to the first embodiment of the present invention.

In addition to the structures of the above embodiments, as shown in FIGS. 11A, 11B, and 11C, a cover member should be provided on the actuator 20 on the side on which the piezoelectric element 22 is arranged.

FIGS. 11A, 11B, and 11C are cross-sectional views showing the structures of tactile presentation devices 10C, 10D, and 10E of modification examples of the tactile presentation device 10 according to the first embodiment of the present invention. FIGS. 11A, 11B, and 11C show the cross sections of the tactile presentation devices 10C, 10D, and 10E in planes parallel to the side surfaces thereof.

The tactile presentation device 10C shown in FIG. 11A has a cover member 80A which is not contacted with the piezoelectric element 22 and has a peripheral edge joined to the base substrate 21. The tactile presentation device 10D shown in FIG. 11B has a cover member 80B which coats the piezoelectric element 22. The cover members 80A and 80B are made of a material having lower rigidity than the base substrate 21. The tactile presentation device 10E shown in FIG. 11C has a cover member 80C which is not contacted with the piezoelectric element 22 and covers the entire surface of the base substrate 21. Like the base substrate 21 of the actuator 20, the cover member 80C is fixed to the top surface chassis 101.

With the use of the cover members 80A, 80B, and 80C, particles caused from the piezoelectric element 22 can be prevented from being scattered into the inner space of the chassis 100. With this, bad influence of the particles onto other components can be prevented. In addition, with the use of the cover members 80A, 80B, and 80C, the piezoelectric element 22 can be prevented from the external environment. For instance, when the top surface chassis 101 and the bottom surface chassis 102 are joined to each other, breakage of the piezoelectric element 22 touched by the operator can be prevented.

Figure 12:
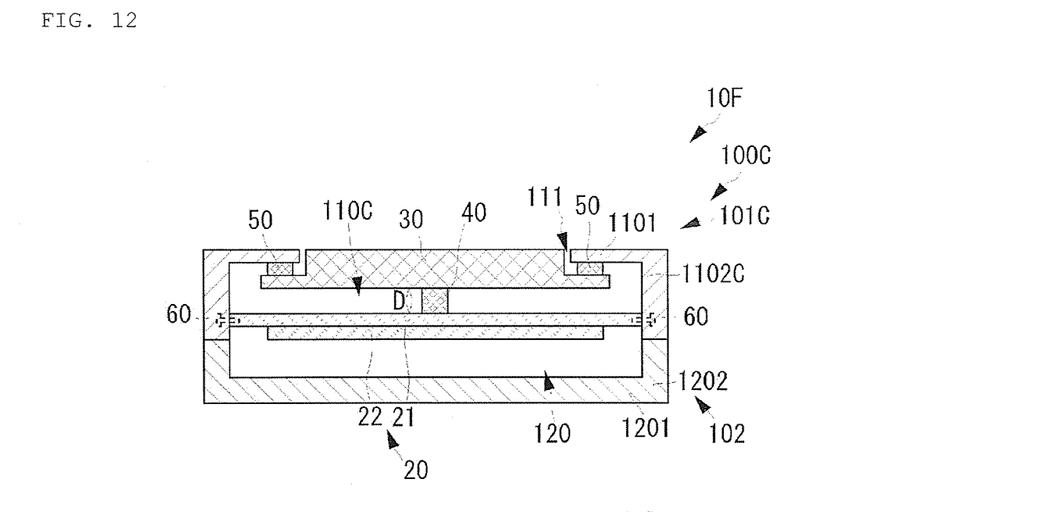
FIG. 12 is a cross-sectional view showing the structure of a tactile presentation device 10F according to a fourth embodiment of the present invention.

In the above embodiments, the actuator 20 is fixed to the top surface chassis 101 on the surface of the base substrate 21 on the side on which the piezoelectric element 22 is not arranged, but the structure as shown in FIG. 12 may be employed. FIG. 12 is a cross-sectional view showing the structure of a tactile presentation device 10F according to a fourth embodiment of the present invention. FIG. 12 shows the cross section of the tactile presentation device 10F in a plane parallel to the side surface thereof.

The tactile presentation device 10F shown in FIG. 12 is different from the tactile presentation device 10 according to the first embodiment in that the structure of fixing the actuator to the top surface chassis is changed, and only the relevant portions will be described in detail. In place of the chassis 100 of the tactile presentation device 10 according to the first embodiment, the tactile presentation device 10F has a chassis 100C. The chassis 100C has a top surface chassis 101C, and the bottom surface chassis 102. The top surface chassis 101C has the top surface 1101, and a side surface 1102C. The side surface of the base substrate 21 is abutted onto the side surface 1102C of the top surface chassis 101C. On the abutting surface, the base substrate 21 is fixed to the side surface 1102C of the top surface chassis 101C with the fixing members 60.

Even with such a structure, both of the touch panel 30 and the actuator 20 are fixed to the top surface chassis 101C. Therefore, the actuator 20 and the touch panel 30 can be assembled with high accuracy at a predetermined interval therebetween without depending on the assembling accuracy of the top surface chassis 101C and the bottom surface chassis 102.

DESCRIPTION OF REFERENCE SYMBOLS 10, 10A, 10B, 10C, 10D, 10E, 10F: Tactile presentation device
20, 20', 20", 20A: Actuator
21, 21', 21", 22A: Base substrate
22, 22A: Piezoelectric element
30: Touch panel
40, 40A, 40B: Pad
50, 51: Buffer material
60: Fixing member
70: Reinforcement member
71: Outer peripheral portion
72: Inner peripheral portion
73: Through-hole
74: Recess
100, 100A, 100B, 100C: Chassis
101, 101A, 101B, 101C: Top surface chassis
110, 110A, 110B, 110C: Top surface inner space
111: Opening
102: Bottom surface chassis
120: Bottom surface inner space
1101: Top surface
1102, 1102A, 1102B, 1102C, 1202: Side surface
1103, 1103A: First fixing surface
1201: Bottom surface

The invention claimed is:

1. A tactile presentation device comprising:
a chassis including:
an upper frame with a top surface having an opening disposed therein and a side surface extending perpendicularly from a peripheral edge of the top surface,
a lower frame coupled to the upper frame to define an inner space therebetween of the chassis;
a touch panel coupled to the top surface of the upper frame of the chassis, such that at least a portion of the touch panel is disposed in the inner space of the chassis and a first surface of the touch panel is exposed by the opening of the upper frame;
an actuator having a planar surface directly coupled to a first bottom surface of the top frame that extends perpendicularly from the side surface of the upper frame and facing the lower frame, where the actuator is disposed in the inner space of the chassis; and
a vibration transmission member disposed between the actuator and the touch panel,
wherein the lower frame has a top surface that is directly coupled to a second bottom surface of the top frame with the second bottom surface of the top frame being in a different plane than the first bottom surface of the top frame.

2. The tactile presentation device according to claim 1, wherein the vibration transmission member comprises a first end abutted to a second surface of the touch panel opposite the first surface of the touch panel, and a second end abutted to the actuator.

3. The tactile presentation device according to claim 1, wherein the actuator comprises a piezoelectric element and a base substrate.

4. The tactile presentation device according to claim 3, wherein the vibration transmission member comprises a height equal to a distance between a plane defined by the second surface of the touch panel and a plane defined by a surface of the base substrate of the actuator.

5. The tactile presentation device according to claim 3, further comprising a cover member that covers the piezoelectric element of the actuator.

6. The tactile presentation device according to claim 1, wherein the planar surface of the actuator is substantially parallel to the first surface of the touch panel, and
wherein the actuator is configured to vibrate in a direction orthogonal to the first surface of the touch panel.

7. The tactile presentation device according to claim 1, wherein the vibration transmission member is abutted to a center position of the actuator, and
wherein a peripheral edge of the actuator is coupled to the side surface of the upper frame of the chassis.

8. The tactile presentation device according to claim 1, wherein the side surface of the upper frame of the chassis includes:
an outer surface extending perpendicularly from the peripheral edge of the top surface of the upper frame,
an inner surface extending perpendicularly from a portion of the top surface interior to the peripheral edge, with the inner surface extending parallel to the outer surface; and
a fixing surface extending perpendicular from the inner surface towards the outer surface and parallel to the top surface of the upper frame,
wherein the fixing surface comprises at least a portion of the bottom surface of the top frame.

9. The tactile presentation device according to claim 8, wherein a peripheral edge of the actuator is coupled to the fixing surface.

10. The tactile presentation device according to claim 9, wherein the vibration transmission member has a height equal to a distance between a plane defined by the second surface of the touch panel and a plane defined by the fixing surface.

11. The tactile presentation device according to claim 1, wherein the vibration transmission member comprises an insulating material.

12. The tactile presentation device according to claim 1, further comprising a reinforcement member disposed between the actuator and the touch panel and having a through-hole in which the vibration transmission member is disposed therethrough.

13. The tactile presentation device according to claim 12, wherein a first space between the actuator and the reinforcement member and a second space between the touch panel and the reinforcement member are equal to or less than a maximum allowable warping amount of the actuator.

14. The tactile presentation device according to claim 1, wherein the top surface is a planar surface and the first surface of the touch panel is disposed in a plane defined by the planar surface.

15. The tactile presentation device according to claim 14, wherein the touch panel comprises a peripheral edge that is parallel to the first surface and disposed in the inner space of the chassis, and the peripheral edge of the touch panel is coupled to the top surface of the upper frame by a buffer material.

16. A tactile presentation device, comprising:
a chassis including:
an upper frame with a top surface having an opening disposed therein and a side surface extending perpendicularly from a peripheral edge of the top surface,
a lower frame coupled to the upper frame to define an inner space therebetween of the chassis;
a touch panel coupled to the top surface of the upper frame of the chassis, such that at least a portion of the touch panel is disposed in the inner space of the chassis and a first surface of the touch panel is exposed by the opening of the upper frame;
an actuator coupled to the side surface of the upper frame and disposed in the inner space of the chassis;
a vibration transmission member disposed between the actuator and the touch panel; and
a reinforcement member disposed between the actuator and the touch panel and having a through-hole in which the vibration transmission member is disposed therethrough,
wherein the reinforcement member is integral with the side surface of the upper frame of the chassis.

17. The tactile presentation device according to claim 16, wherein the touch panel is disposed between the top surface of the upper frame of the chassis and the reinforcement member.

18. The tactile presentation device according to claim 17, wherein the touch panel is coupled to the top surface of the upper frame of the chassis and the reinforcement member by a buffer material.

19. A tactile presentation device, comprising:
a chassis including:
an upper frame with a top surface having an opening disposed therein and a side surface extending perpendicularly from a peripheral edge of the top surface,
a lower frame coupled to the upper frame to define an inner space therebetween of the chassis;
a touch panel coupled to the top surface of the upper frame of the chassis, such that at least a portion of the touch panel is disposed in the inner space of the chassis and a first surface of the touch panel is exposed by the opening of the upper frame;
an actuator coupled to the side surface of the upper frame and disposed in the inner space of the chassis;
a vibration transmission member disposed between the actuator and the touch panel; and
a reinforcement member disposed between the actuator and the touch panel and having a through-hole in which the vibration transmission member is disposed therethrough,
wherein a first surface of the reinforcement member is coupled to the side surface of the upper frame of the chassis, and
wherein a second surface of the reinforcement member is coupled to the actuator.

* * * * *